(12) United States Patent
Beeler et al.

(10) Patent No.: US 9,374,161 B2
(45) Date of Patent: *Jun. 21, 2016

(54) SYSTEM AND METHOD FOR SATELLITE LINK BUDGET ANALYSIS (LBA) OPTIMIZATION

(71) Applicant: Comtech EF Data Corp., Tempe, AZ (US)

(72) Inventors: Michael Beeler, Jefferson, MD (US); Vasile Manea, Potomac, MD (US); Joshua Bolick, Phoenix, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/263,888

(22) Filed: Apr. 28, 2014

(65) Prior Publication Data

US 2014/0233611 A1 Aug. 21, 2014

Related U.S. Application Data

(63) Continuation-in-part of application No. 14/179,764, filed on Feb. 13, 2014.

(60) Provisional application No. 61/907,305, filed on Nov. 21, 2013.

(51) Int. Cl.
*H04B 10/118* (2013.01)
*H04B 7/185* (2006.01)

(52) U.S. Cl.
CPC .......... *H04B 10/118* (2013.01); *H04B 7/18513* (2013.01); *H04B 7/18519* (2013.01)

(58) Field of Classification Search
None
See application file for complete search history.

(56) References Cited

U.S. PATENT DOCUMENTS

| | | | |
|---|---|---|---|
| 2008/0274690 A1* | 11/2008 | Laufer | H04B 7/18515 455/13.4 |
| 2012/0188880 A1* | 7/2012 | Beeler | H04L 41/145 370/246 |

\* cited by examiner

*Primary Examiner* — Kevin C Harper
*Assistant Examiner* — Derrick V Rose
(74) *Attorney, Agent, or Firm* — Booth Udall Fuller, PLC

(57) ABSTRACT

A method of optimizing a link budget analysis comprising performing a first LBA based on a target modulation and coding pair (MODCOD), the MODCOD having a symbol energy to noise density ratio (Es/No), a target setting of a power amplifier, or a target antenna size, determining an excess margin and increasing or decreasing a maximum available MODCOD accordingly, iteratively performing a second LBA, calculating a ratio of allocated bandwidth to PEB and adjusting at least one of the MODCOD, amplifier power, and antenna size, summing a contribution to a final ratio of allocated bandwidth to PEB of the plurality of communications links, accessing a look up table and selecting a new MODCOD or adjusting the amplifier size or antenna size is based on the ratio of allocated bandwidth to PEB and altering one or more transmission or receiving parameters to apply the optimal MODCOD, amplifier size, or antenna size.

20 Claims, 16 Drawing Sheets

| CALCULATIONS AT SATURATION | VALUE | | UNITS |
|---|---|---|---|
| Gain 1m^2 | 44.53 | | dB/m2 |
| Uplink C/No | 97.57 | | dB.Hz |
| Downlink C/No | 110.92 | | dB.Hz |
| Total C/No | 97.37 | | dB.Hz |
| Uplink EIRP for saturation | 70.55 | | dBW |
| Effective SFD | -92.6 | | dBW/m |

| GENERAL CALCULATIONS | UP | DOWN | UNITS |
|---|---|---|---|
| Elevation | 40.86 | 50.12 | degree |
| True azimuth | 204.04 | 191.8 | degree |
| Compass bearing | 216.34 | 196.69 | degree |
| Path distance to satellite | 37713.18 | 37069.09 | km |
| Propagation time delay | 0.125797 | 0.123649 | second |
| Antenna efficiency | 65 | 65 | % |
| Antenna gain | 43.2 | 59.55 | dBi |
| Availability (average year) | 99.6 | 99.8 | % |
| Link downtime (average year) | 35.064 | 17.532 | hours |
| Availability (worst month) | 98.716 | 99.297 | % |
| Link downtime (worst month) | 9.382 | 5.134 | hours |
| Maximum availability at current HPA power | 0 | | % |

| UPLINK CALCULATION | CLEAR | RAIN UP | RAIN DOWN | UNITS |
|---|---|---|---|---|
| Uplink transmit EIRP | 39.2 | 39.2 | 39.2 | dBW |
| Transponder input back-off (total) | 6 | 6 | 6 | dB |
| Input back-off per carrier | 31.35 | 33.67 | 31.35 | dB |
| Antenna mispoint | 0.5 | 0.5 | 0.5 | dB |
| Free space loss | 207.05 | 207.05 | 207.05 | dB |
| Atmospheric absorption | 0.12 | 0.23 | 0.12 | dB |
| Tropospheric scintillation fading | 0 | 0.22 | 0 | dB |
| Cloud attenuation | 0 | 0.58 | 0 | dB |
| Rain attenuation | 0 | 1.63 | 0 | dB |
| Total attenuation (gas-rain-cloud-scintillation) | 0.12 | 2.45 | 0.12 | dB |
| Other path losses | 0 | 0 | 0 | dB |
| Uplink power control | 0 | 0 | 0 | dB |
| Uncompensated fade | 0 | 2.32 | 0 | dB |
| C/No (thermal) | 66.22 | 63.89 | 66.22 | dB.Hz |
| C/N (thermal) | 7.98 | 5.66 | 7.98 | dB |
| C/ACI | 17.19 | 14.87 | 17.19 | dB |
| C/ASI | 15.19 | 12.87 | 15.19 | dB |
| C/XPI | 17.19 | 16.41 | 17.19 | dB |
| C/IM | 50.41 | 50.41 | 50.41 | dB |
| C/(N+I) [ = Es/(No+Io) ] | 6.43 | 4.22 | 6.43 | dB |
| Eb/(No+Io) | 1.77 | -0.44 | 1.77 | dB |

FIG. 8A

| DOWNLINK CALCULATION | CLEAR | RAIN UP | RAIN DOWN | UNITS |
|---|---|---|---|---|
| Satellite EIRP total | 50.71 | 50.71 | 50.71 | dBW |
| Transponder output back-off (total) | 3 | 3 | 3 | dB |
| Output back-off per carrier | 28.35 | 30.67 | 28.35 | dB |
| Satellite EIRP per carrier | 22.36 | 20.04 | 22.36 | dBW |
| Antenna mispoint | 0.5 | 0.5 | 0.5 | dB |
| Free space loss | 205.38 | 205.38 | 205.38 | dB |
| Atmospheric absorption | 0.09 | 0.09 | 0.13 | dB |
| Tropospheric scintillation fading | 0 | 0 | 0.11 | dB |
| Cloud attenuation | 0 | 0 | 0.35 | dB |
| Rain attenuation | 0 | 0 | 1.97 | dB |
| Total attenuation (gas-rain-cloud-scintillation) | 0.09 | 0.09 | 2.46 | dB |
| Other path losses | 0 | 0 | 0 | dB |
| Noise increase due to precipitation | 0 | 0 | 2.29 | dB |
| Downlink degradation (DND) | 0 | 0 | 4.65 | dB |
| Total system noise | 146.77 | 146.77 | 248.66 | K |
| Figure of merit (G/T) | 37.58 | 37.58 | 35.29 | dB/K |
| C/No (thermal) | 82.57 | 80.25 | 77.92 | dB.Hz |
| C/N (thermal) | 24.34 | 22.01 | 19.68 | dB |
| C/ACI | 23.19 | 20.87 | 23.19 | dB |
| C/ASI | 23.19 | 20.87 | 23.19 | dB |
| C/XPI | 23.19 | 20.87 | 24.92 | dB |
| C/IM | 109.78 | 109.78 | 109.78 | dB |
| C/(N+I) [ = Es/(No+Io) ] | 17.43 | 15.11 | 16.28 | dB |
| Eb/(No+Io) | 12.77 | 10.45 | 11.62 | dB |

| TOTALS PER CARRIER (End-to-End) | CLEAR | RAIN UP | RAIN DOWN | UNITS |
|---|---|---|---|---|
| C/No (thermal) | 66.12 | 63.79 | 65.93 | dB.Hz |
| C/N (thermal) | 7.88 | 5.56 | 7.7 | dB |
| C/ACI | 16.22 | 13.9 | 16.22 | dB |
| C/ASI | 14.55 | 12.23 | 14.55 | dB |
| C/XPI | 16.22 | 15.08 | 16.52 | dB |
| C/IM | 50.41 | 50.41 | 50.41 | dB |
| C/I (total) | 10.82 | 8.81 | 10.9 | dB |
| C/(No+Io) | 64.33 | 62.11 | 64.24 | dB.Hz |
| C/(N+I) [ = Es/(No+Io) ] | 6.1 | 3.88 | 6 | dB |
| Eb/(No+Io) | 1.44 | -0.78 | 1.34 | dB |
| Implementation loss | 0 | 0 | 0 | dB |
| System margin | 1 | 1 | 1 | dB |
| Net Es/(No+Io) | 5.1 | 2.88 | 5 | dB |
| Required Es/(No+Io) | 10.96 | 10.96 | 10.96 | dB |
| Excess margin | -5.86 | -8.08 | -5.96 | dB |

FIG. 8B

| EIRP DENSITY CALCULATIONS | CLEAR | RAIN UP | RAIN DOWN | UNITS |
|---|---|---|---|---|
| Flange transmit (up) | -62.24 | -62.24 | -62.24 | dBW/Hz |
| Satellite (down) | -35.88 | -38.2 | -35.88 | dBW/Hz |
| Flange receive (down) | -181.8 | -184.12 | -186.45 | dBW/Hz |

| EARTH STATION POWER REQUIREMENTS | VALUE | UNITS |
|---|---|---|
| EIRP per carrier | 39.2 | dBW |
| Antenna gain | 43.2 | dBi |
| Antenna feed flange power per carrier | -4 | dBW |
| Uplink power control | 0 | dB |
| HPA output back off | 3 | dB |
| Waveguide loss | 1 | dB |
| Number of HPA carriers | 1 | |
| Total HPA power required | 0 | dBW |
| Required HPA power | 1 | W |

| SPACE SEGMENT UTILIZATION | VALUE | UNITS |
|---|---|---|
| Overall availability | 99.401 | % |
| Information rate | 1.9477 | Mbps |
| Information rate (inc overhead) | 1.9477 | Mbps |
| Transmit rate | 2.6644 | Mbps |
| Symbol rate | 0.6661 | Mbaud |
| Noise Bandwidth | 58.24 | dB.Hz |
| Occupied bandwidth | 0.8992 | MHz |
| Minimum allocated bandwidth required | 0.8992 | MHz |
| Allocated transponder bandwidth | 0.8992 | MHz |
| Link efficiency | 2.166 | bps/Hz |
| Percentage transponder bandwidth used | 2.5 | % |
| Used transponder power | 22.36 | dBW |
| Percentage transponder power used | 0.29 | % |
| Max carriers / transponder | 40.03 | |
| Limited by: | Bandwidth | |
| Power equivalent bandwidth usage | 0.105 | MHz |

| MODCOD | QPSK 1/4 | QPSK 1/3 | QPSK 2/5 | QPSK 1/2 | QPSK 3/5 | QPSK 2/3 | QPSK 3/4 | QPSK 4/5 | QPSK 5/6 | QPSK 8/9 | QPSK 9/10 | 8PSK 3/5 | 8PSK 2/3 | 8PSK 3/4 |
|---|---|---|---|---|---|---|---|---|---|---|---|---|---|---|
| MOD. INDEX | 4 | 4 | 4 | 4 | 4 | 4 | 4 | 4 | 4 | 4 | 4 | 8 | 8 | 8 |
| FEC | 0.2500 | 0.3330 | 0.4000 | 0.5000 | 0.6000 | 0.6667 | 0.7500 | 0.8000 | 0.8333 | 0.8889 | 0.9000 | 0.7500 | 0.6667 | 0.7500 |
| EFFICIENCY | 0.479 | 0.641 | 0.771 | 0.965 | 1.160 | 1.291 | 1.452 | 1.549 | 1.615 | 1.724 | 1.746 | 1.740 | 1.936 | 2.178 |
| ES/NO | -2.30 | -1.10 | -0.20 | 1.20 | 2.50 | 3.30 | 4.40 | 5.00 | 5.40 | 6.50 | 6.80 | 6.10 | 7.00 | 8.30 |

| MODCOD | 8PSK 5/6 | 8PSK 8/9 | 8PSK 9/10 | 16APSK 2/3 | 16APSK 3/4 | 16APSK 4/5 | 16APSK 5/6 | 16APSK 8/9 | 16APSK 9/10 | 32APSK 3/4 | 32APSK 4/5 | 32APSK 5/6 | 32APSK 8/9 | 32APSK 9/10 |
|---|---|---|---|---|---|---|---|---|---|---|---|---|---|---|
| MOD. INDEX | 8 | 8 | 8 | 16 | 16 | 16 | 16 | 16 | 16 | 32 | 32 | 32 | 32 | 32 |
| FEC | 0.8333 | 0.8889 | 0.9000 | 0.6667 | 0.7500 | 0.8000 | 0.8333 | 0.8889 | 0.9000 | 0.7500 | 0.8000 | 0.8333 | 0.8889 | 0.9000 |
| EFFICIENCY | 2.422 | 2.586 | 2.618 | 2.575 | 2.896 | 3.090 | 3.222 | 3.440 | 3.483 | 3.623 | 3.866 | 4.031 | 4.303 | 4.357 |
| ES/NO | 9.70 | 10.90 | 11.20 | 9.60 | 11.10 | 11.50 | 12.10 | 13.40 | 13.70 | 14.00 | 15.20 | 15.10 | 16.10 | 18.60 |

FIG. 14

SYSTEM AND METHOD FOR SATELLITE LINK BUDGET ANALYSIS (LBA) OPTIMIZATION

CROSS REFERENCE TO RELATED APPLICATIONS

This document is a continuation-in-part of U.S. application Ser. No. 14/179,764, entitled "System and Method for Satellite Link Budget Analysis (LBA) Optimization" to Michael Beeler et al., which was filed on Feb. 13, 2014 and claims the benefit of the filing date of U.S. Provisional Patent Application No. 61/907,305, entitled "Optimization Techniques for Satellite Link Budget Analysis (LBA)" to Michael Beeler et al., which was filed on Nov. 21, 2013, the disclosures of which are hereby incorporated entirely by reference herein.

BACKGROUND

1. Technical Field

Aspects of this document relate generally to telecommunication systems and techniques for transmitting data across a telecommunication channel.

2. Background Art

Since the introduction of satellite communications, a recurring problem continuing to challenge the industry is how to tie a theoretical understanding of the communications path between one side of a communications path, over a satellite, and then from the satellite to the receiving station. The complexity of engineering a communications path or link between a station located on or near the earth and a space-based repeating relay is made complex, by many variables, such as the free-space path loss, the effects of weather (rain, atmospheric gasses, etc.), look angle to the satellite, ionospheric effects, troposphere effects, etc. These problems become more complex as the transmission frequency increases.

SUMMARY

Implementations of a method of optimizing a link budget analysis (LBA) for a communications link within a communications system having a plurality of communications links may comprise performing, using a processor, a first LBA based on a target modulation and coding pair (MODCOD) that is selected based on one or more transmission or receiving link parameters, the MODCOD having at least one of a predetermined symbol energy to noise density ratio (Es/No), a target setting of a power amplifier, and a target antenna size, determining, by the processor, an excess margin from the first LBA and increasing or decreasing a maximum available MODCOD based on whether the excess margin has a positive or a negative value, and performing, by the processor, a second LBA using the increased or decreased maximum MODCOD and iteratively repeating increasing or decreasing the maximum available MODCOD and performing a subsequent LBA using the increased or decreased maximum available MODCOD. The method may further comprise calculating, by the processor a ratio of allocated bandwidth to a power equivalent bandwidth (PEB) and adjusting at least one of the MODCOD, amplifier power, and antenna size based on the calculated ratio, determining, by the processor, whether additional energy is present in the communications link by summing a contribution to a final ratio of allocated bandwidth to PEB of the communications system made by each of the plurality of communications links, accessing a look up table (LUT) to determine an optimal MODCOD for the communications link wherein at least one of the following actions is performed by the processor: 1) if the sum is a positive value, selecting a MODCOD having a higher Es/No; 2) if the sum is a negative value, selecting a MODCOD having a lower Es/No; or 3) adjusting the amplifier size or antenna size is based on the ratio of allocated bandwidth to PEB; and altering one or more transmission or receiving parameters to apply the selected optimal MODCOD, amplifier size, or antenna size.

Particular aspects may comprise one or more of the following features. The method may further comprise performing the first LBA using at least one of an initial MODCOD, amplifier power setting, and antenna size setting. The method may further comprise performing a first optimization using results of the first LBA using a maximum MODOCD as determined from the excess margin of the first LBA without adjusting the amplifier power or antenna size. The optimal MODCOD selected may have an Es/No that is a highest value among possible MODCODS without exceeding a sum of the Es/No of the target MODCOD and the calculated ratio of allocated bandwidth to PEB. The optimal MODCOD selected may have an Es/No that exceeds a sum of the Es/No of a target MODCOD and the calculated ratio of allocated bandwidth to PEB by an amount that is within a predetermined range of variance of the sum. The method may further comprise performing a plurality of first LBAs based on a plurality of target MODCODs for a plurality of communications links and summing the calculated ratios of allocated bandwidth to PEB for all of the communications links to result in a total allocated bandwidth and a total PEB. The method may further comprise performing a plurality of first LBAs based on a plurality of target MODCODs for a plurality of links sharing a common transmission or receiving hub, calculating a ratio of allocated bandwidth to a power equivalent bandwidth (PEB) a maximum allocated bandwidth from among the plurality of links and a maximum PEB from among the plurality of links and converting the calculated ratio to Decibels, and determining whether additional energy is present in the plurality of communications links by summing the Es/No for a most disadvantaged communications link at the target MODCOD and the calculated ratio of allocated bandwidth to PEB based on the maximum allocated bandwidth and PEB from among the plurality of links. The communications link may be a forward link over which communications are transmitted from a local transmitter to a remote receiver. The communications link may be a return link over which communications are transmitted from a local receiver to a remote transmitter. The method may be performed using both a forward link over which communications are transmitted from a local transmitter to a remote receiver and a return link over which communications are transmitted from a local receiver to a remote transmitter.

Implementations of a system for optimizing a link budget analysis (LBA) for a communications link within a communications system having a plurality of communications links may comprise a transmitter configured to transmit a communications signal, a receiver configured to receive the communications signal and create a communications link between the transmitter and receiver, the receiver and transmitter located remotely from each other, and a processor configured to perform a first LBA based on a target modulation and coding pair (MODCOD) that is selected based on one or more transmission or receiving link parameters, the MODCOD having at least one of a predetermined symbol energy to noise density ratio (Es/No), a target setting of a power amplifier, and a target antenna size. The processor may be further configured to determine an excess margin from the first LBA and increase or decrease a maximum available MODCOD based on whether the excess margin has a positive or a negative value, perform a second LBA using the increased or decreased maximum MODCOD, iteratively repeat increasing or decreasing the maximum available MODCOD and perform a subsequent LBA using the increased or decreased maximum available MODCOD, calculate a ratio of allocated bandwidth to a power equivalent bandwidth (PEB) and adjust at least one of the MODCOD, amplifier power, and antenna size based on the calculated ratio, determine whether additional energy is present in the communications link by summing a contribution to a final ratio of allocated bandwidth to PEB of the communications system made by each of the plurality of communications links, access a look up table (LUT) to determine an optimal MODCOD for the communications link and perform at least one of the following actions: 1) if the sum is a positive value, a MODCOD having a higher Es/No is selected; 2) if the sum is a negative value, a MODCOD having a lower Es/No is selected; or 3) the amplifier size or antenna size is adjusted based on the ratio of allocated bandwidth to PEB; and alter one or more transmission or receiving parameters to apply the selected optimal MODCOD, amplifier size, or antenna size.

Particular aspects may comprise one or more of the following features. The processor may be further configured to perform the first LBA using at least one of an initial MODCOD, amplifier power setting, and antenna size setting. The processor may be further configured to perform a first optimization using results of the first LBA using a maximum MODOCD as determined from the excess margin of the first LBA without adjusting the amplifier power or antenna size. The optimal MODCOD selected may have an Es/No that is a highest value among possible MODCODS without exceeding a sum of the Es/No of the target MODCOD and the calculated ratio of allocated bandwidth to PEB. The optimal MODCOD selected may have an Es/No that exceeds a sum of the Es/No of a target MODCOD and the calculated ratio of allocated bandwidth to PEB by an amount that is within a predetermined range of variance of the sum. The processor may be further configured to perform a plurality of first LBAs based on a plurality of target MODCODs for a plurality of communications links and sum the calculated ratios of allocated bandwidth to PEB for all of the communications links to result in a total allocated bandwidth and a total PEB. The processor may be further configured to perform a plurality of first LBAs based on a plurality of target MODCODs for a plurality of links sharing a common transmission or receiving hub, calculate a ratio of allocated bandwidth to a power equivalent bandwidth (PEB) a maximum allocated bandwidth from among the plurality of links and a maximum PEB from among the plurality of links and converting the calculated ratio to Decibels, and determine whether additional energy is present in the plurality of communications links by summing the Es/No for a most disadvantaged communications link at the target MODCOD and the calculated ratio of allocated bandwidth to PEB based on the maximum allocated bandwidth and PEB from among the plurality of links. The communications link may be a forward link over which communications are transmitted from a local transmitter to a remote receiver. The communications link may be a return link over which communications are transmitted from a local receiver to a remote transmitter. The processor may be further configured to use both a forward link over which communications are transmitted from a local transmitter to a remote receiver and a return link over which communications are transmitted from a local receiver to a remote transmitter.

Aspects and applications of the disclosure presented here are described below in the drawings and detailed description.

Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112(f). Thus, the use of the words "function," "means" or "step" in the Description, Drawings, or Claims is not intended to somehow indicate a desire to invoke the special provisions of 35 U.S.C. §112(f), to define the invention. To the contrary, if the provisions of 35 U.S.C. §112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112(f). Moreover, even if the provisions of 35 U.S.C. §112 (f) are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 8A-C show an example of a link budget analysis (LBA) as known in the prior art.

Figure 9:
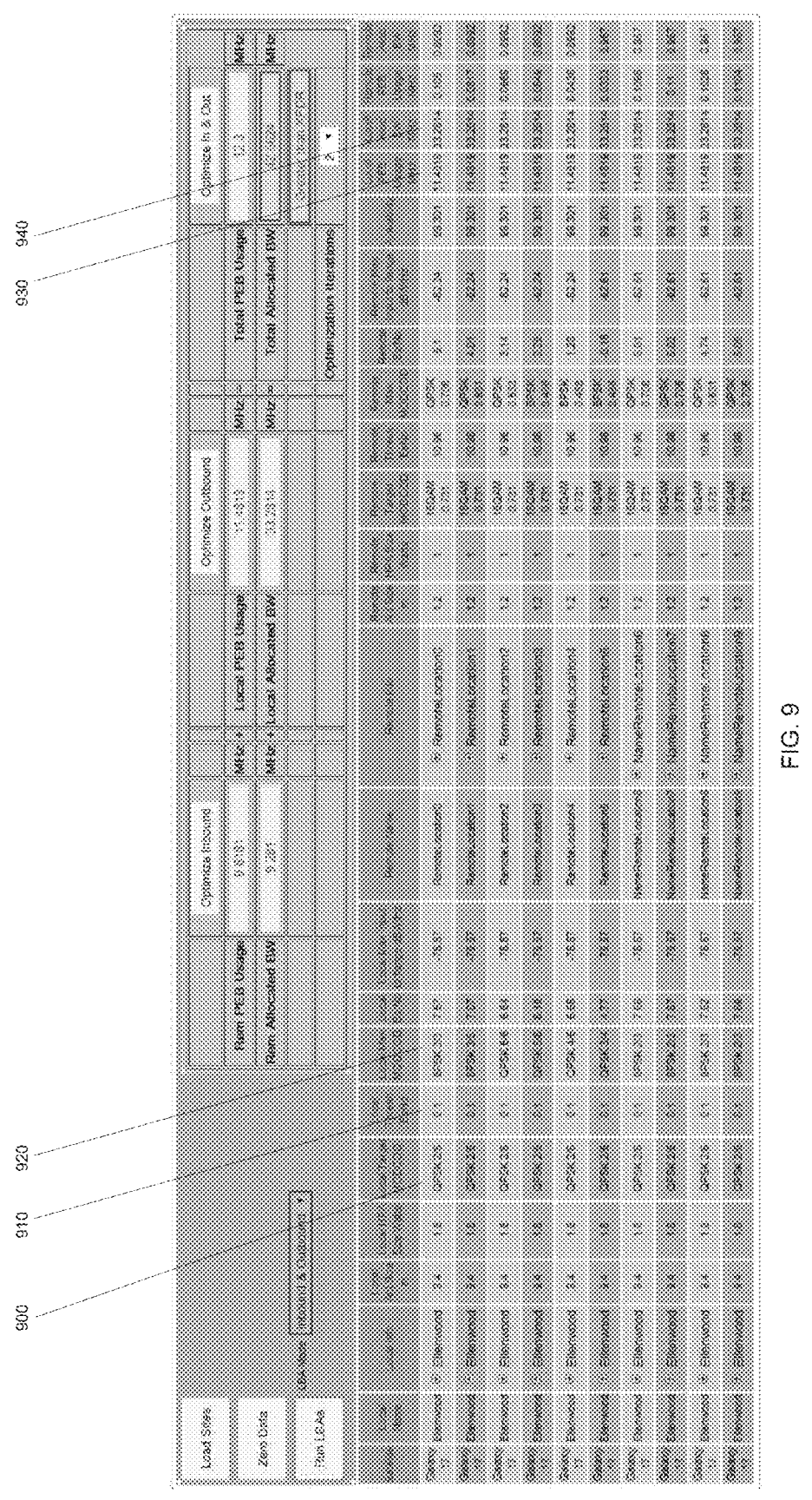

FIG. 9 shows an implementation of a link budget analysis using an implementation of the described method in which a single LBA or a plurality of LBAs may be performed.

FIG. 10 shows an implementation of a LBA using an implementation of the described method that has been further optimized for both the forward and return communications links using only consideration of the Excess Margin from the LBA.

FIG. 12 shows an implementation of a LBA using an implementation of the described method that has been further optimized for only inbound communications links.

FIG. 13 shows an implementation of a LBA using an implementation of the described method that has been further optimized for only outbound communications links.

FIG. 14 shows a representative table showing characteristics of Digital Video Broadcast—Satellite Version 2 (DVB-S2) of each modulation and FEC coding format (MODCOD) and the associated modulation index, FEC, efficiency and required Es/No.

DESCRIPTION

Figure 1:
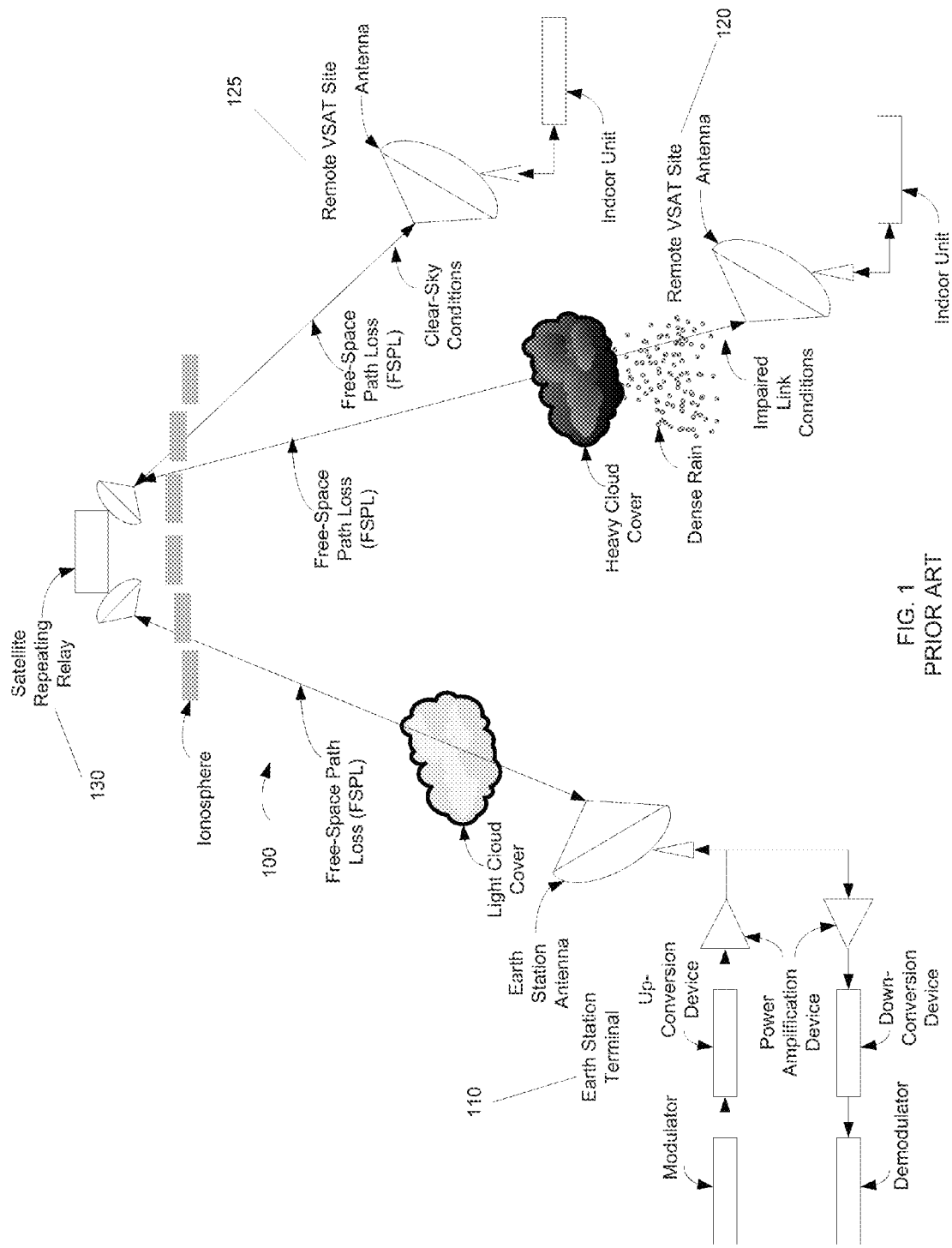
FIG. 1 shows a prior art typical configuration of a communications link operating over a satellite repeating relay.

This disclosure, its aspects and implementations, are not limited to the specific components, frequency examples, or methods disclosed herein. Many additional components and assembly procedures known in the art consistent with the optimization techniques for satellite link budget analysis (LBA) are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to systems and methods for performing link budget analysis (LBA) optimization techniques to optimize satellite links. Implementations of the described methods provide procedures for analyzing and engineering a satellite link or links for optimal operation. The use of standard link budget analysis techniques may be the foundation of the invention, but the manner in which the LBAs are optimized, and the use of multiple links, are further used to compare one against another to allow the links be further optimized for best use of a satellite repeating relay's resources.

A typical communications satellite is comprised of one or a plurality of satellite transponders that receive communication from or near the earth. The received signal may be filtered, amplified, frequency converted, and sent back toward the earth. Engineering the links based on the free-space path loss, look angle to the satellite, weather effects, ionospheric effects, troposphere effects, etc. are well understood, but engineering the links in a manner that takes into account more than one link budget analysis (LBA) is the subject of this disclosure. The present disclosure covers how the standard LBA may be further enhanced, and consideration of multiple links to ensure all resources on or near the earth and the satellite repeating relay are fully optimized. Embodiments of the disclosed system and methods can be employed for an electromagnetic emitting device, such as optical or Radio Frequency (RF) transmission equipment for point-to-point, point-to-multipoint and/or multipoint-to-multipoint operation.

This disclosure relates to, but is not limited to, providing optimization techniques for a link budget analysis (LBA) for a single link or a plurality of links and/or link budget analyses. Traditionally, a link budget analysis (LBA) is performed on a single link from a transmitting station, to a satellite repeating relay and then to a receiving station. In the existing art, an LBA must be done one at a time for every link. The optimization the transmission engineer strives to achieve is to ensure that required bandwidth, typically called "allocated bandwidth" is minimized and the required power equivalent bandwidth (PEB) is also minimized. In the art, the objective for the engineer is to ensure both allocated bandwidth and PEB are as small as possible, but ensure the link can meet the bandwidth requirements while achieving the desired availability of the link. For traditional link budgets, the analysis is performed by an engineer. The LBA input information may include 1) parameters about the transmit site such as for example, a type of equipment, an antenna size and/or capabilities of the amplifier; 2) parameters about the satellite such as for example, frequencies, power of the satellite, antenna size of the satellite; and 3) parameters about the receive site; type of equipment antenna size and capabilities of the low-noise amplifier. All of the aforementioned information is entered into the LBA, which may be a series of calculations, spread sheets or an executable computer program. The results of the analysis demonstrates the amount of loss or required gain to overcome the loss of the transmission link (attenuation) to support communications (close the link) over the link.

Implementations of the disclosed invention use the described techniques and results in one or a plurality of link budgets to further optimize the transmission parameters such as modulation, power, FEC and any common resources of the satellite equipment such as the transponder resources (bandwidth and power).

The algorithms used to estimate the physics of the link budget are extremely well understood, but the methods by which they are applied in a novel manner are the subject of this disclosure. Implementations of the method described provide the ability for someone skilled in the art, e.g., a satellite operator or transmission engineer/planner to gather information about the use of a transmission path and its resources.

Particular implementations of optimization techniques for satellite LBAs herein may be specifically employed in satellite communications systems. However, as will be clear to those of ordinary skill in the art from this disclosure, the principles and aspects disclosed herein may readily be applied to any electromagnetic (IF, RF and optical) communications system, such terrestrial broadcast network without undue experimentation.

The methods described in this disclosure may employ digital signal processing (DSP) techniques such as power combining or splitting, frequency mixing, adaptive filtering or equalization, which can be easily implemented in passive and active power splitters and combiners, frequency mixing circuits, Field-Programmable Gate Array (FPGA), Programmable Logic Device (PLD), Programmable Integrated Circuit (PIC), Digital Signal Processor (DSP), Application Specific Integrated Circuit (ASIC) or microprocessors using conventional implementation methods known in the art with knowledge of this disclosure. Particular implementations described herein are and may use, but are not limited to, spread sheet programs, computer programming languages, or microprocessors.

FIG. 1 illustrates a particular implementation of a communications transmission carrier 100 wherein the forward path (earth station terminal 110 to remote VSAT site 120, 125) may be modulated to intermediate frequency (IF) or radio frequency (RF), upconverted, amplified, and transmitted through free-space to a satellite repeating relay 130. At the satellite repeating relay 130, the carrier may be received, filtered, amplified, linearized, frequency converted, channelized, amplified, and transmitted through free-space to a ground station 120, 125. At the receiving station (remote VSAT) 120, 125, the carrier may be received, down converted, amplified, filtered, demodulated and decoded. For each path from the earth station terminal 110 to the satellite repeating relay 130 this is the "uplink path" (first-half) of the transmission path, and the "downlink path" from the satellite 130 to the remote VSAT site 120, 125 is the second-half of the link. The entire link budget is comprised of both the uplink and downlink paths. An example of a standard LBA is shown in FIG. 8, where all the variables are filled in to obtain an estimation of the link losses from the earth station terminal 110 to the satellite 130, and then from the satellite 130 to the receiving remote VSAT site 120, 125. If the transmission path is "bi-directional," a link budget may also be done from the transmitting remote VSAT site 120, 125 to the satellite 130, and from the satellite 130 to the earth station terminal 110. One or ordinary skill in the art, this would be know this to be a return-link (or return channel) link budget analysis.

Figure 2:
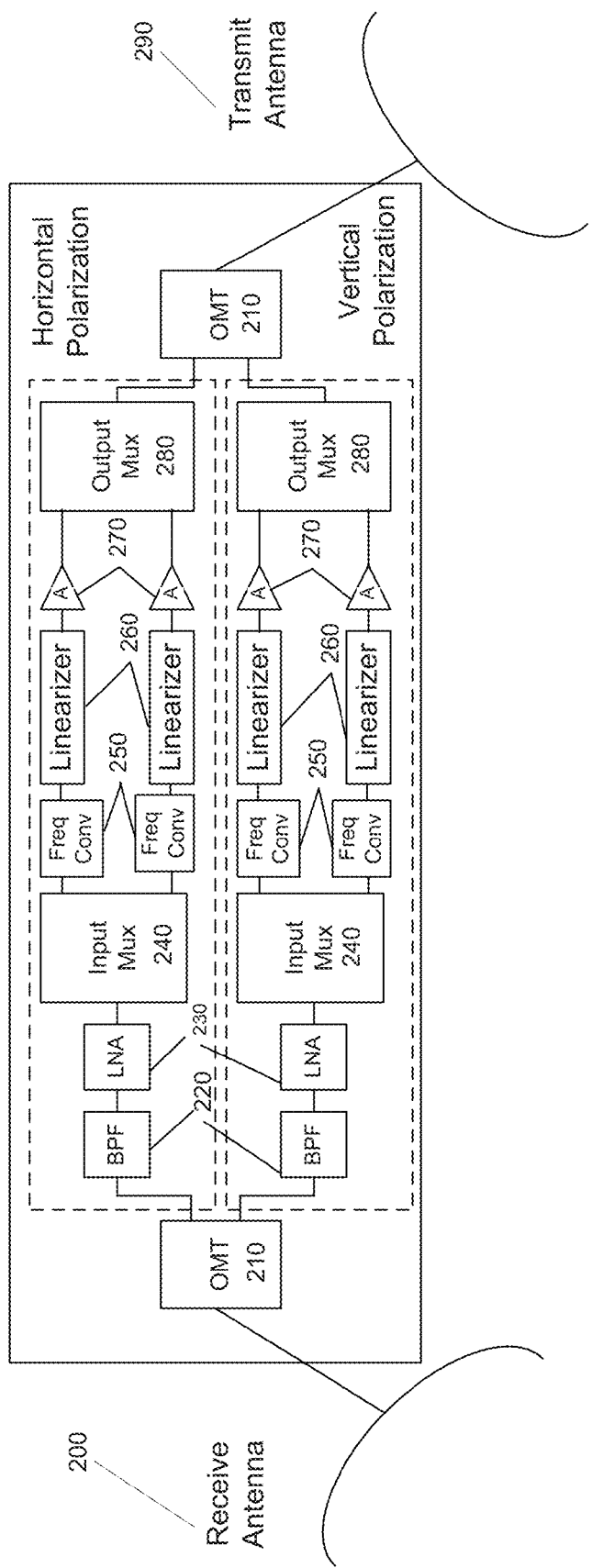
FIG. 2 shows a prior art typical implementation of a typical satellite repeating relay as found in the prior art.
Figure 3:
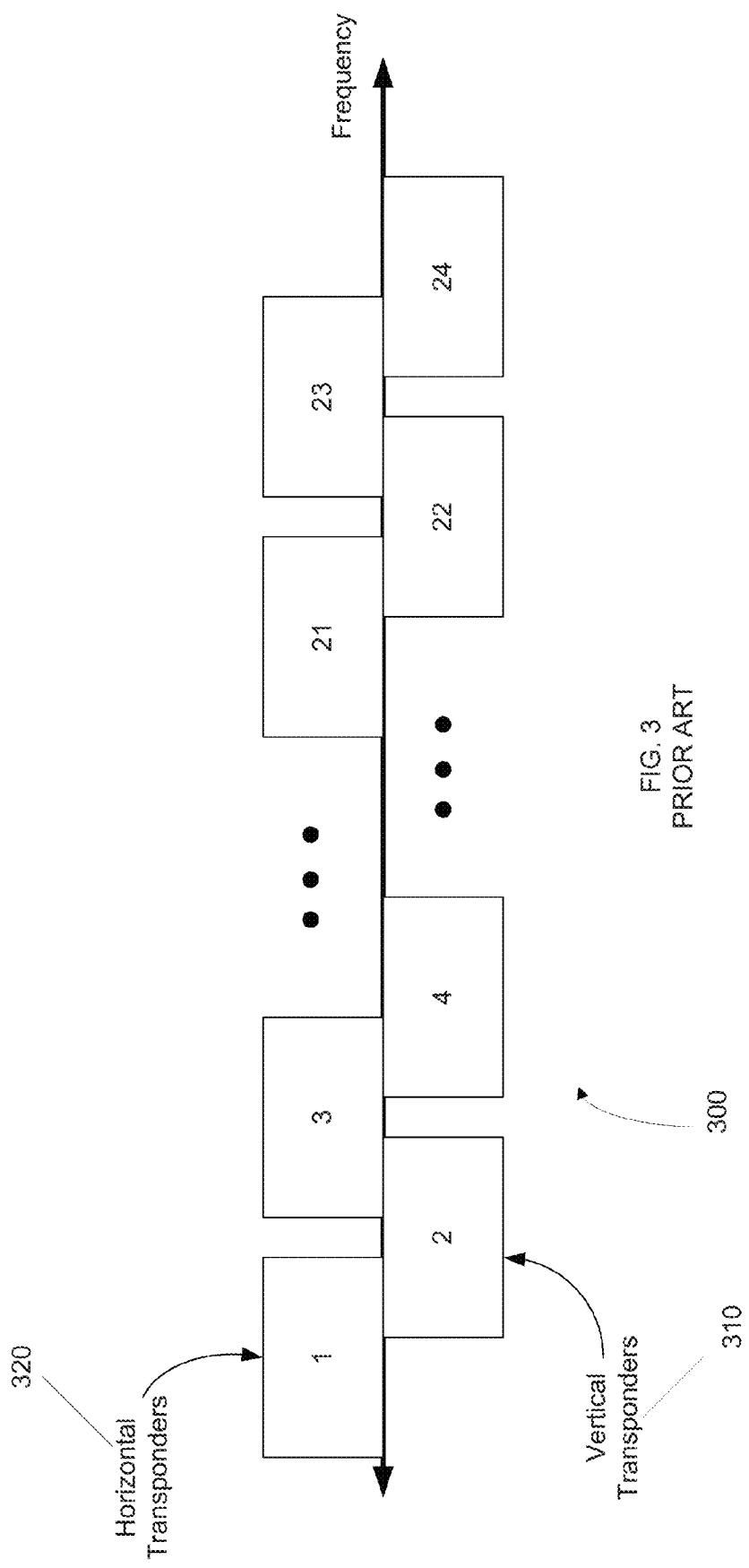
FIG. 3 shows an implementation of a typical arrangement of a satellite repeating relay with multiple transponders as found in the prior art.
Figure 4:
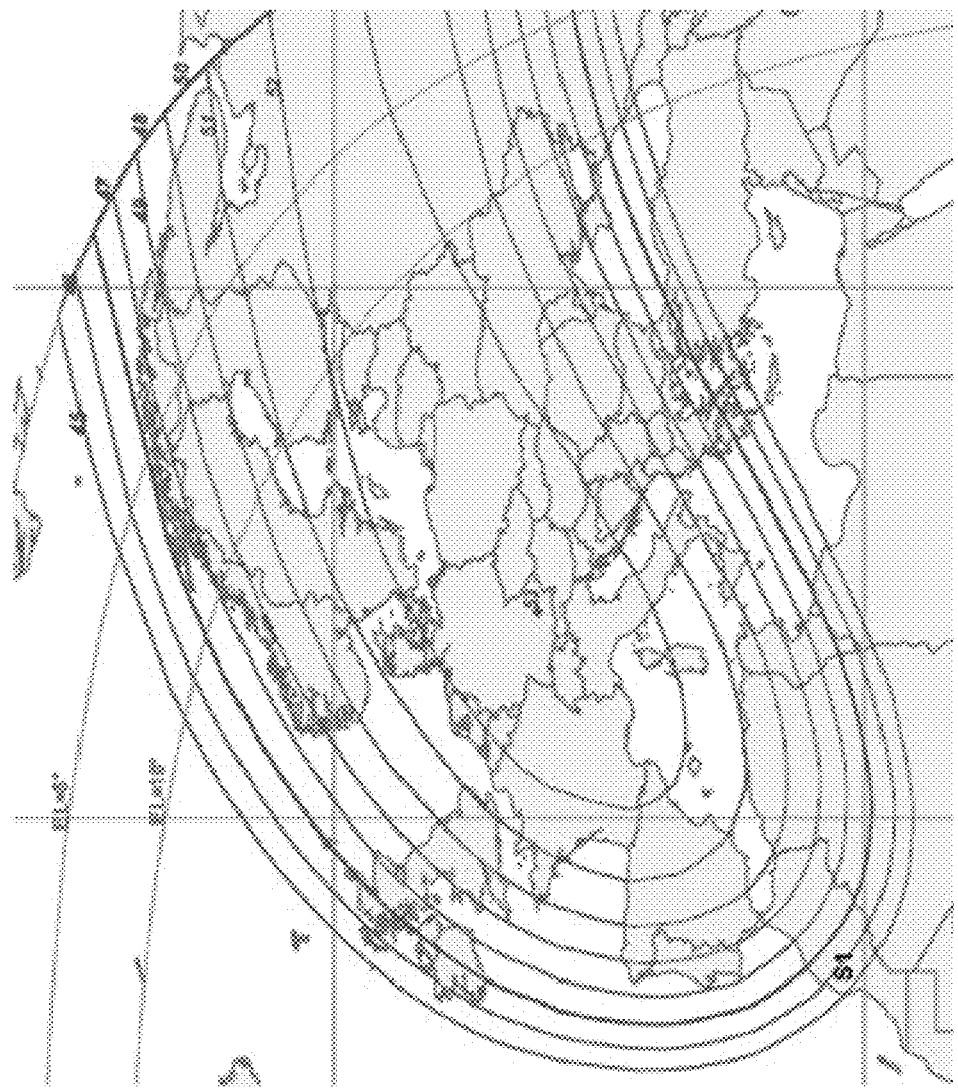
FIG. 4 shows an implementation of a satellite beam map showing effective isotropic radiated power (EIRP) contours.

FIG. 2 show an example of a typical satellite repeating relay 130 that is comprised of a receive antenna 200 that has a known gain, various components within the satellite repeating relay, such as an ortho-mode transducer 210, a bandpass filter 220, a low-noise amplifier, an input multiplexer 240, a frequency converter 250, a linearizer 260, an amplifier 270, and an output multiplexer 280, and a transmit antenna 290 with a known gain. FIG. 3 shows a configuration of an implementation of a satellite repeating relay that has multiple transponders 300. Each transponder provides a particular bandwidth over which the spectrum of a satellite is supported. Satellites come in either linear or circular polarization, and there are two types of polarization supported on a satellite. For linear satellites, there is vertical or horizontal polarization using vertical 310 and horizontal transponders 320, and for circular satellites, there is left-hand or right-hand polarization. The polarization allows for frequency re-use based on the selected polarization for transmitting and receiving to and from the satellite repeating relay 130. In the art, no satellite operator provides the gain or performance of the various components of the satellite, but instead provides performance numbers known as G/T (gain over temperature) for the uplink and EIRP (effective isotropic radiated power) for the downlink. Satellite providers provide coverage maps (beam maps) that show the coverage area of the G/T or EIRP. A sample beam map is shown in FIG. 4. The user can look at the location on the beam plot and determine the EIRP for a given location. A G/T uplink map would appear to be similar, but may not follow the exact same contours as the downlink.

Figure 5:
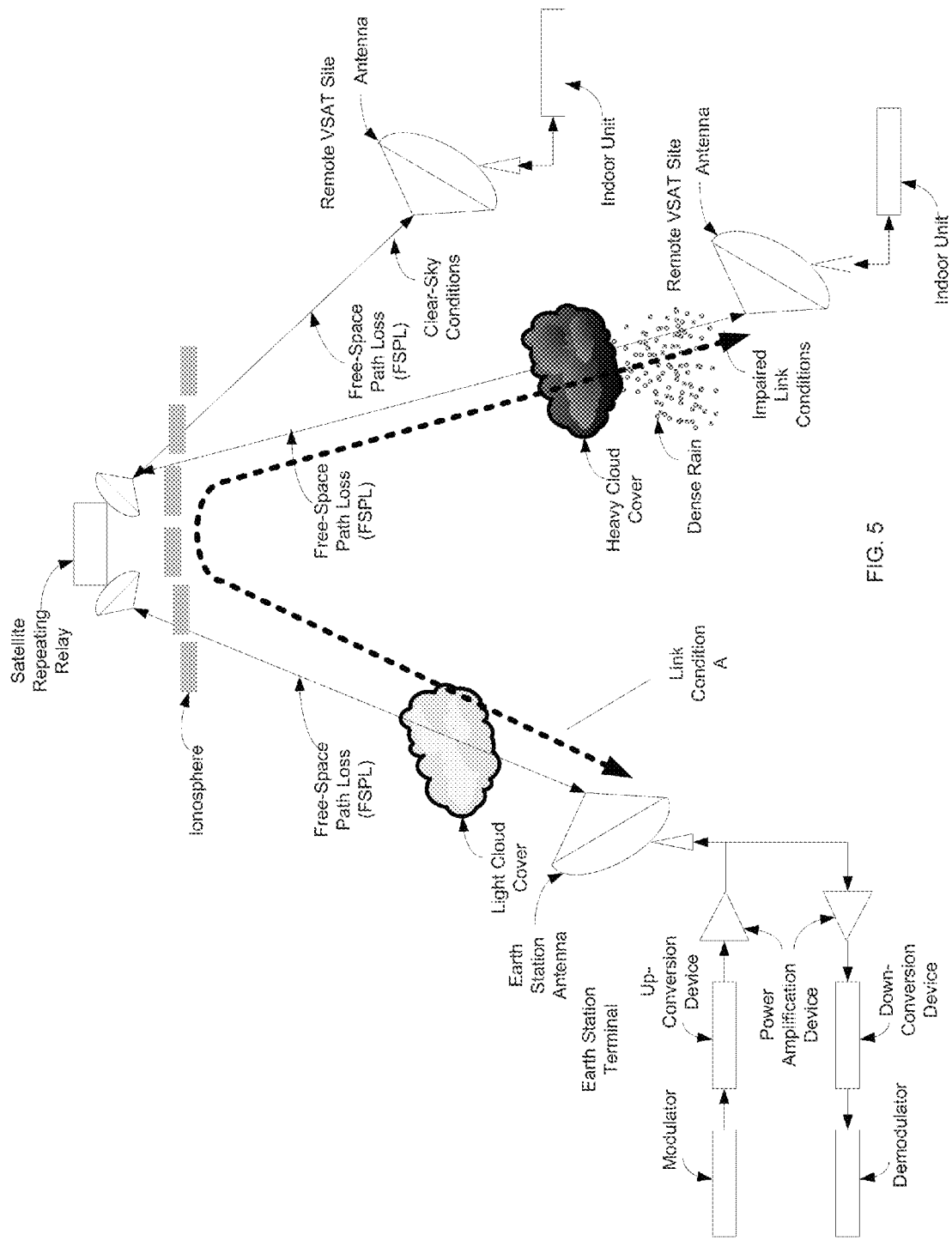
FIG. 5 shows an implementation in which a communications link is maintained in a region with heavy weather effects.
Figure 6:
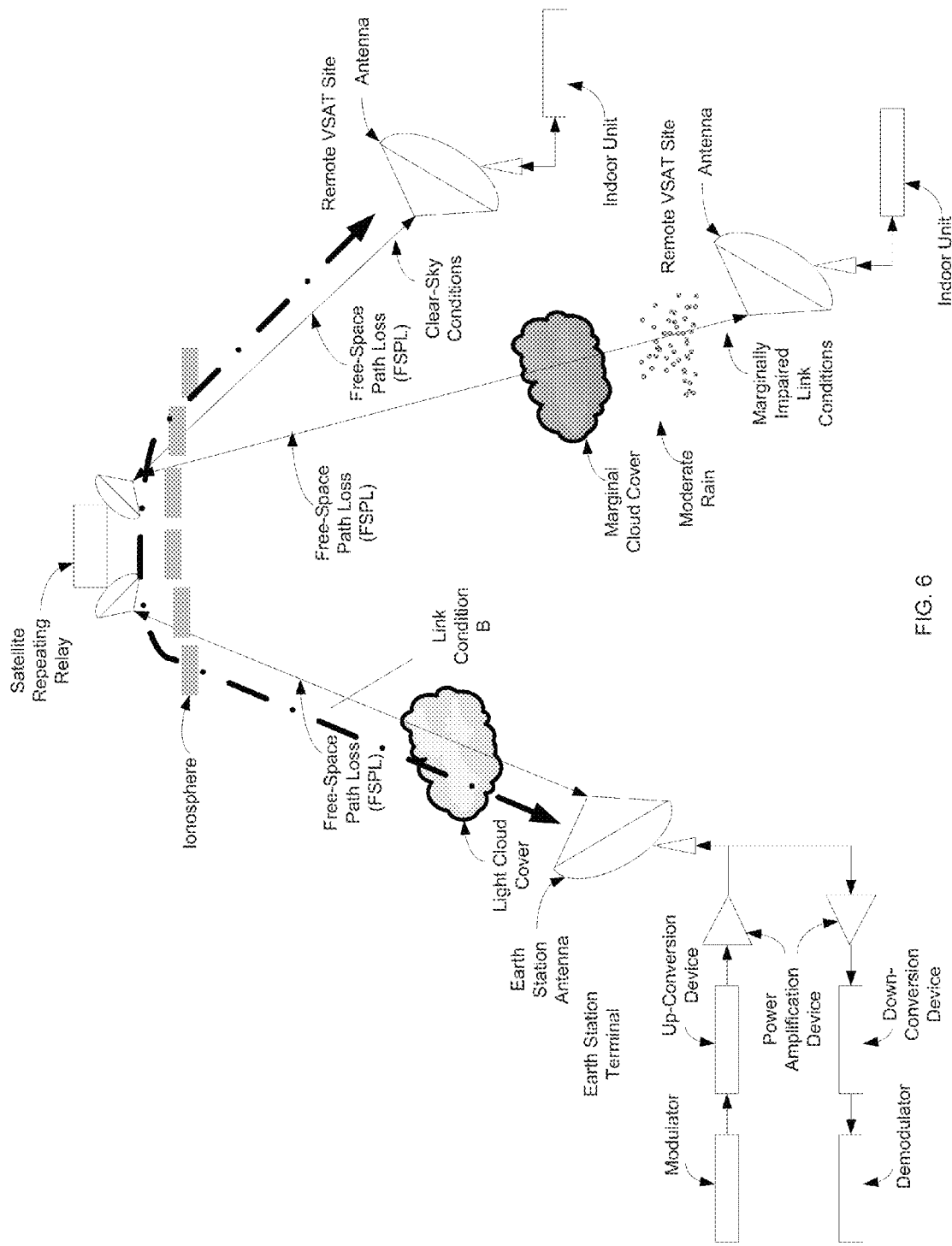
FIG. 6 shows an implementation in which a communications link is maintained in a region with marginal weather effects.
Figure 7:
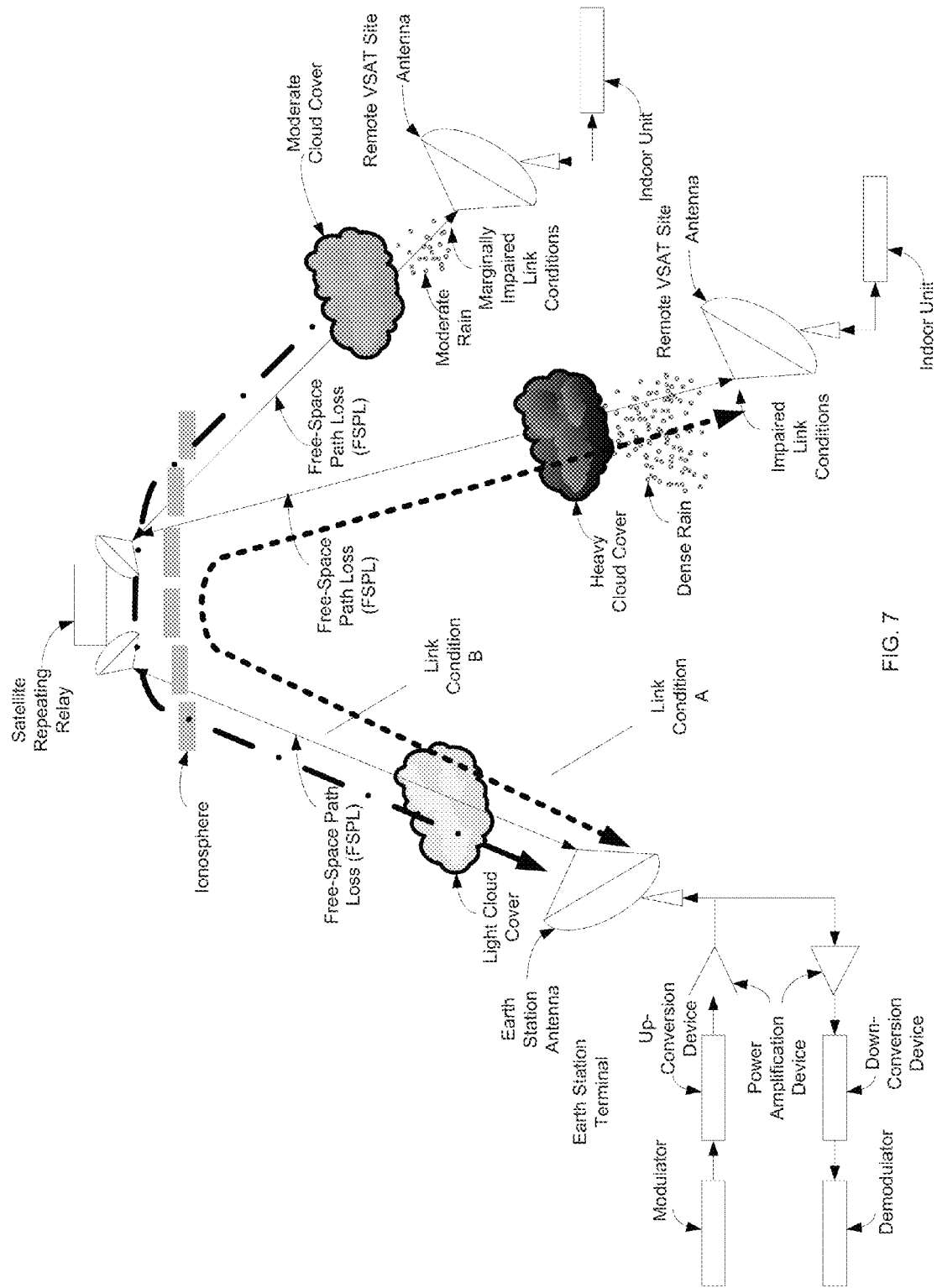
FIG. 7 shows an implementation in which a communications link is maintained in a region with both heavy and marginal weather effects.

FIGS. 5, 6, and 7 demonstrate three link configurations where link budgets may be applied. Traditionally, when performing LBAs, there is an LBA performed in each direction, so for each link supported, there are two LBAs. For FIGS. 5 and 6, there are two LBAs for each site: one for the link between the earth station terminal and the satellite and one for the link between the satellite and the remote VSAT site. For FIG. 7, there are four LBAs total, one for each segment of the communications links as shown. A standard LBA implementation is shown in FIGS. 8A-C where all the parameters are entered by the user and the result shows if the link can be closed. One of ordinary skill in the art would recognize the term "link closed" to mean that communications may be established between the sites and may continue to be maintained at a desired availability.

Implementations of the disclosed method also may use a series of methods to further optimize an LBA. One such implementation may be broken down as follows:

Firstly, the LBA is performed with the desired modulation and FEC coding (Modulation and Coding also known as MODCOD), power amplifier, and antenna size which may be selected by a transmission engineer. The MODCOD, power amplifier, and antenna size is chosen based on one or more estimates and is used to determine if the link may be closed. The desired MODCOD requires a known Symbol Energy/Noise Density (Es/No) to support the modulation and coding format as shown in FIG. 14. The LBA is run with this "target" MODCOD 900 as selected and the results are stored as shown in FIG. 9. An implementation of the method then uses a calculation to determine if the link has any spare energy to close the link at a higher MODCOD—this can be observed on FIG. 8. In one embodiment, after the first LBA has been executed, upon the selection to execute an optimization, the first level of optimization obtains the excess margin from the LBA, as shown in FIGS. 8A-C (Excess Margin clear sky). This is shown in FIG. 9 as MAX MODCOD 920. The MAX MODCOD is derived by adding the Excess Margin from the first pass LBA with the Target Es/No for the link at the target MODCOD as shown in FIG. 9. The excess margin from the LBA may be clear sky, rain up, or rain down. In one embodiment, the clear sky excess margin is used. It must be pointed out that the excess margin may be a positive number (greater than 0) which indicates excess power thus, a higher MODCOD (less FEC) may be selected. Alternatively, the excess margin may be a negative number (less than 0) which indicates a deficit of power, resulting in a lower MODCOD (more FEC) being required. The Excess Margin is applied as shown as follows:

MAX MODCOD=$Es/No$ for the link at the Target MODCOD+the Excess Margin

An example of an implementation of the method is as follows:

Using the results from FIG. 9, the "target" MODCOD 900 was set to QPSK 2/5 (which requires an Es/No of −0.20 dB to close the link) for Remote0. After the first pass through the LBA tool, it was found that the clear sky Excess Margin is 7.93 dB, so the "optimal" or as shown in the tool "MAX" 910 is 8PSK 2/3 which requires an Es/No 7.00 dB as shown in the chart of FIG. 14. Therefore, the MAX MODCOC is −0.20 dB+7.93=7.73 dB or 8PSK 2/3 FEC.

Figure 10:
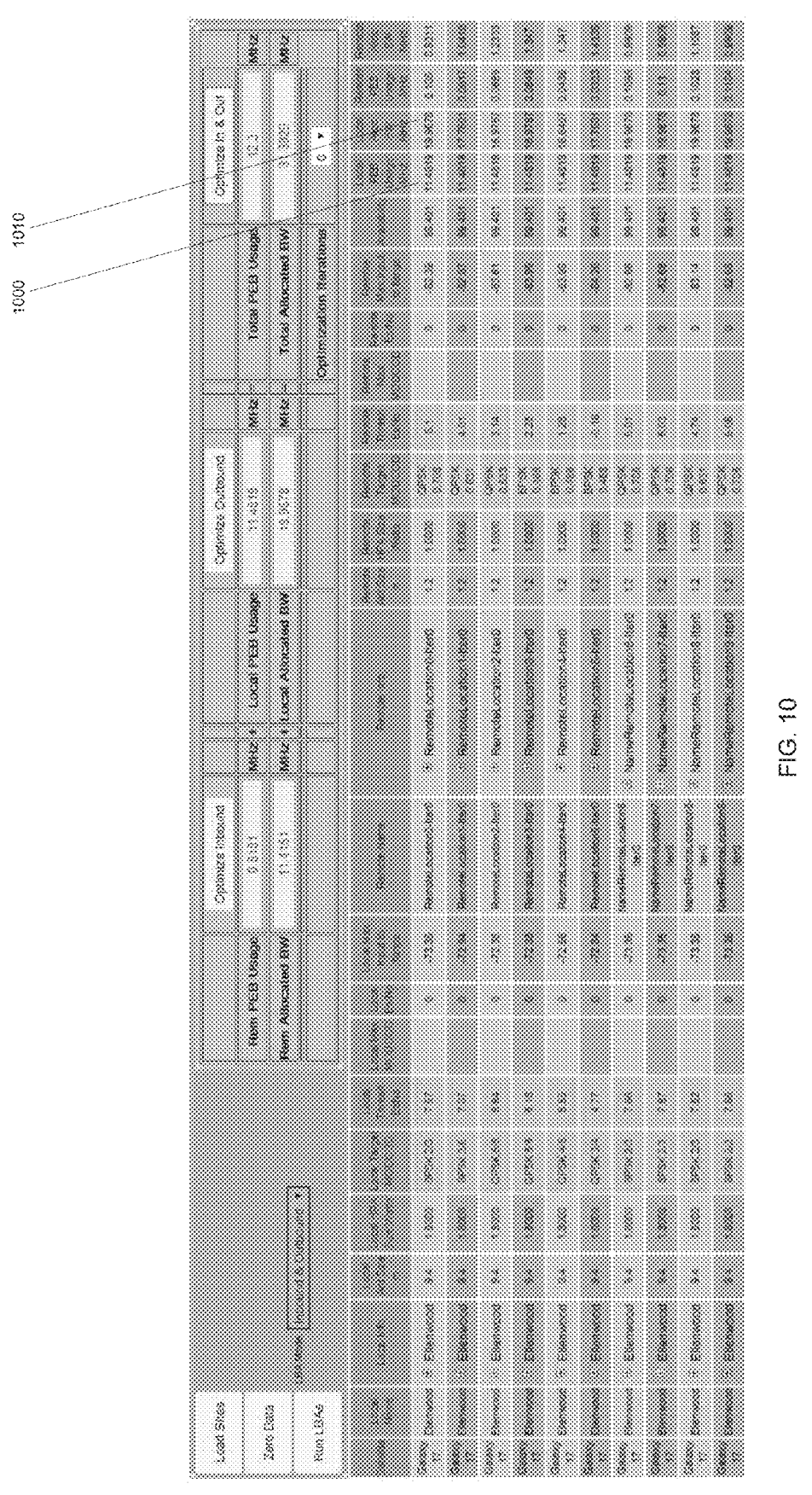

When the Optimization is executed as shown in FIG. 10, with the optimization iterations are set to 0, this causes the algorithm to be executed so that only the use of the Excess Margin from the LBA are used to optimize the link—the first pass only. This single step results in the optimization being preformed where there is no adjustment of power or antenna size, and only the MODCOD is optimized—which may be increased or decreased, based on the Excess Margin.

After the first pass, the remaining iterations, if selected, may be executed in the manner that is described as follows, but an alternate embodiment may use only the following method, thus not executing the initial procedure using the Excess Margin from the LBA. The excess margin (or ratio) may be determined in two ways: the Excess Margin may be reported natively by the LBA as it relates to clear sky conditions, rain up, or rain down, or to the Excess Ratio as shown below:

Excess Ratio=Allocated Bandwidth/PEB Bandwidth

The algorithm allows for the adjustment of the MODCOD, amplifier power, or antenna size.

The Excess Ratio is based on the Allocated Bandwidth and Power Equivalent Bandwidth is used two ways:

First a determination must be made to ascertain if the Excess Margin is greater or less than zero for the three types of Excess Margin: clear sky, rain up, or rain down.

If the Excess Margin is greater than zero, and the Allocated Bandwidth is greater than the PEB Bandwidth, then the ratio is converted to Decibels by using the following ratio as $10*\text{Log}_{10}$ (Excess Ratio). As shown above, the Excess Ratio is then added to the target Es/No and a new MODCOD is looked up to find the new MODCOD to be used on the next pass of the LBA for optimization.

Conversely, if the Allocated Bandwidth is less than the PEB, then the ratio is also Allocated Bandwidth/PEB Bandwidth, but the ratio is directly applied to the scale the size of the amplifier or antenna as a direct multiplier to increase (if the ratio is greater than 1) or to decrease the size of the amplifier or antenna (if the ratio is less than 1).

If the Excess Margin is less than zero, and the Allocated Bandwidth is greater than the PEB Bandwidth, then the ratio is converted to Decibels by using the following ratio as $10*\text{Log}_{10}$ (Excess Ratio). As shown above, the Excess Ratio is then added to the target Es/No and a new MODCOD is looked up to find the new MODCOD to be used on the next pass of the LBA for optimization.

Conversely, if the Allocated Bandwidth is less than the PEB, then the ratio is also Allocated Bandwidth/PEB Bandwidth, but the ratio is directly applied to the scale the size of the amplifier or antenna as a direct multiplier to increase (if the ratio is greater than 1) or to decrease the size of the amplifier or antenna (if the ratio is less than 1).

Additionally, in an alternate embodiment, a scaling factor could be applied to the ratio to artificially cause the scaling to happen more quickly or more slowly.

The resulting mathematical algorithm is shown below:

If the Excess Margin>0:
And, if ALLOC BW>PEB BW:

Excess Ratio in dB for the MODCOD=$10*\text{LOG}_{10}$ (ALLOC BW/PEB BW)

This results in the power or antenna size being reduced and, if ALLOC BW<PEB BW:

Excess Ratio for Scaling Power Amplifier or Antenna=ALLOC BW/PEB BW)

This results in the MODCOD being increased (lower FEC).

If the Excess Margin<=0:
And, if ALLOC BW<PEB BW:

Excess Ratio in dB for the MODCOD=$10*\text{LOG}_{10}$ (ALLOC BW/PEB BW)

This results in the MODCOD being decreased (increased FEC).

And, if ALLOC BW>PEB BW:

Excess Ratio for Scaling Power Amplifier or Antenna=ALLOC BW/PEB BW)

This results in the power or antenna size being increased

As previously noted, in all ratios, a scaling factor may be added to the ratio as: X*(ALLOC BW/PEB BW)

In one implementation of the method, the algorithm maybe applied as follows:

Step 1: Run the LBA natively as shown in FIG. 9.

Step 2: Run the optimization where the native Excess Margin is used to adjust the MODCOD (to raise or lower) to the proper level to adjust the LBA results, so the excess or deficit margin is corrected as in FIG. 10 with the optimization iterations set to 0.

Figure 11:
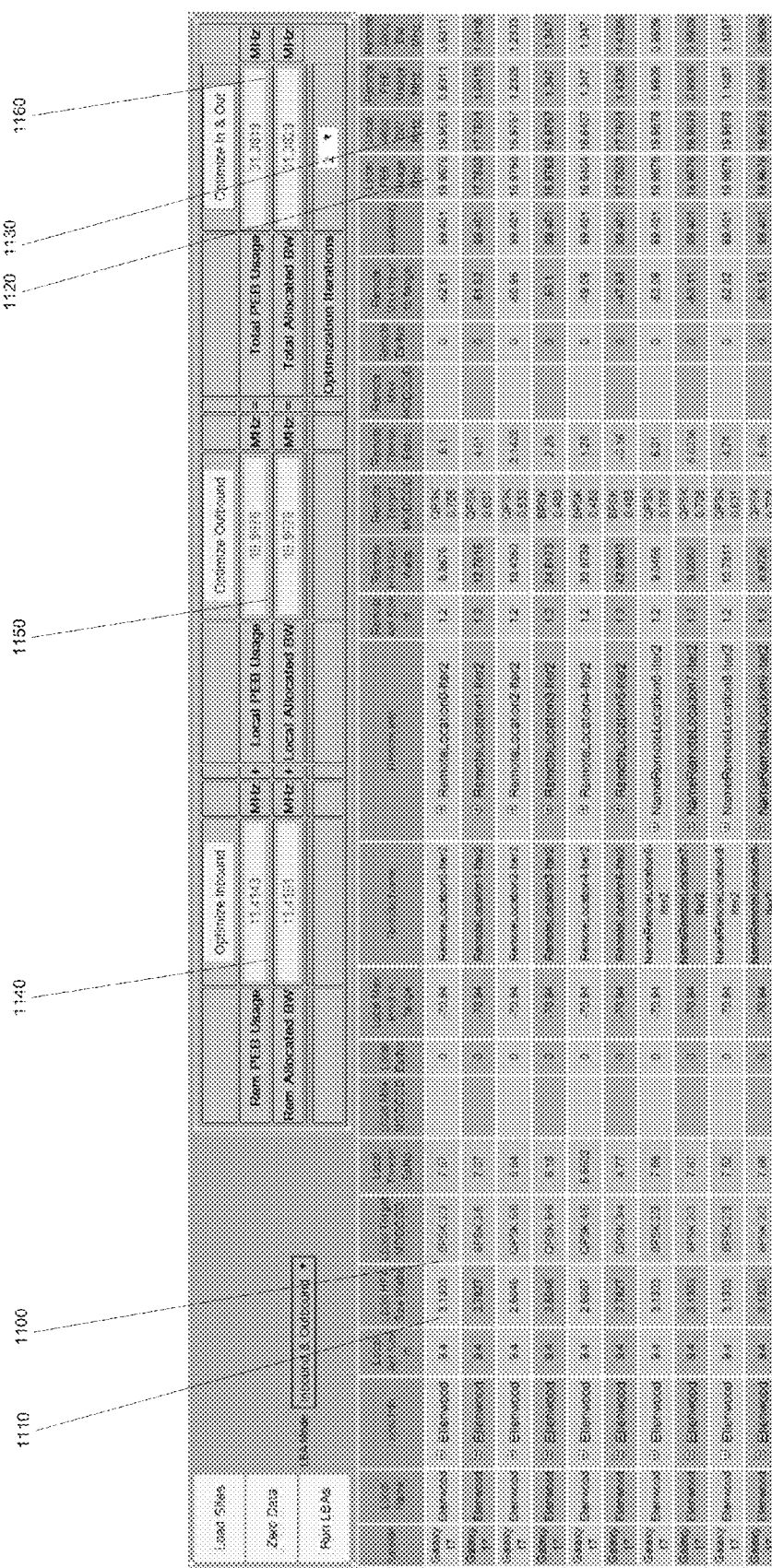
FIG. 11 shows an implementation of a LBA using an implementation of the described method that has been further optimized for both the forward and return communications links.
Figure 12:
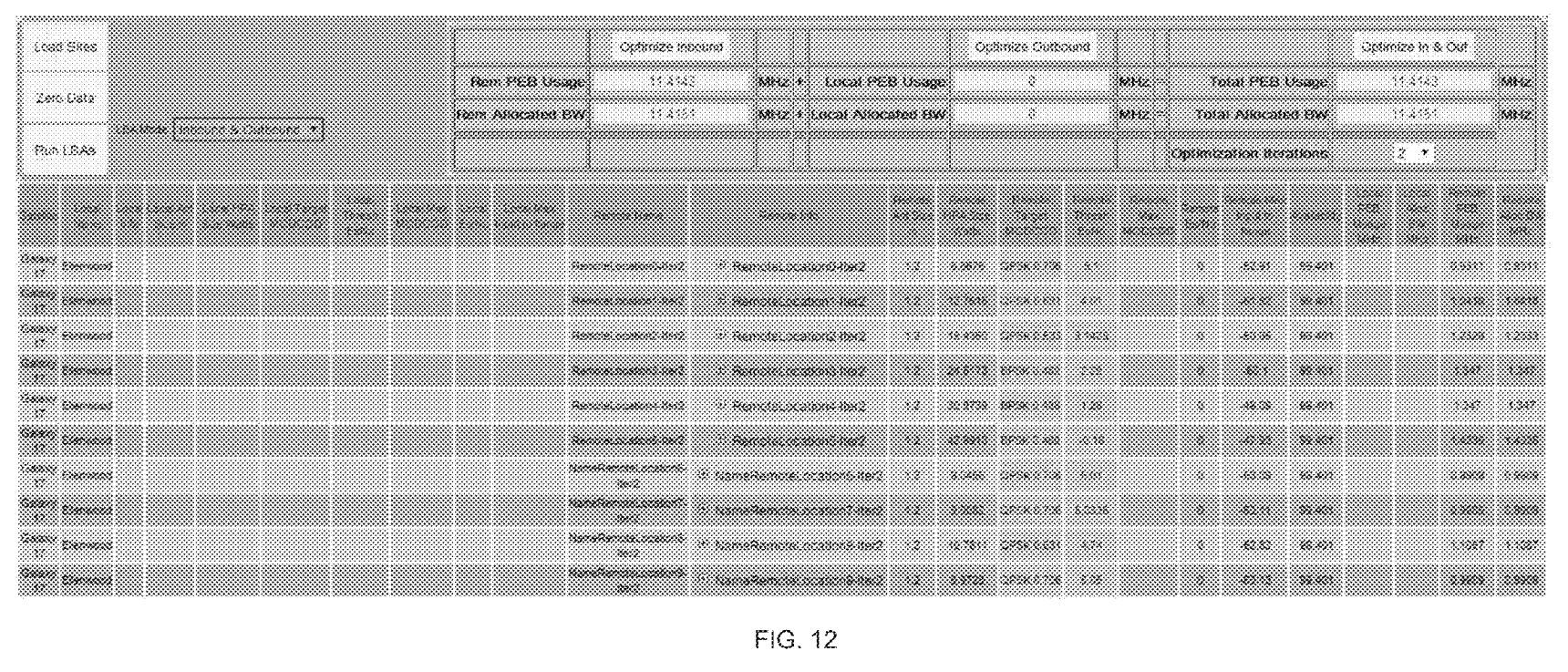
Figure 13:
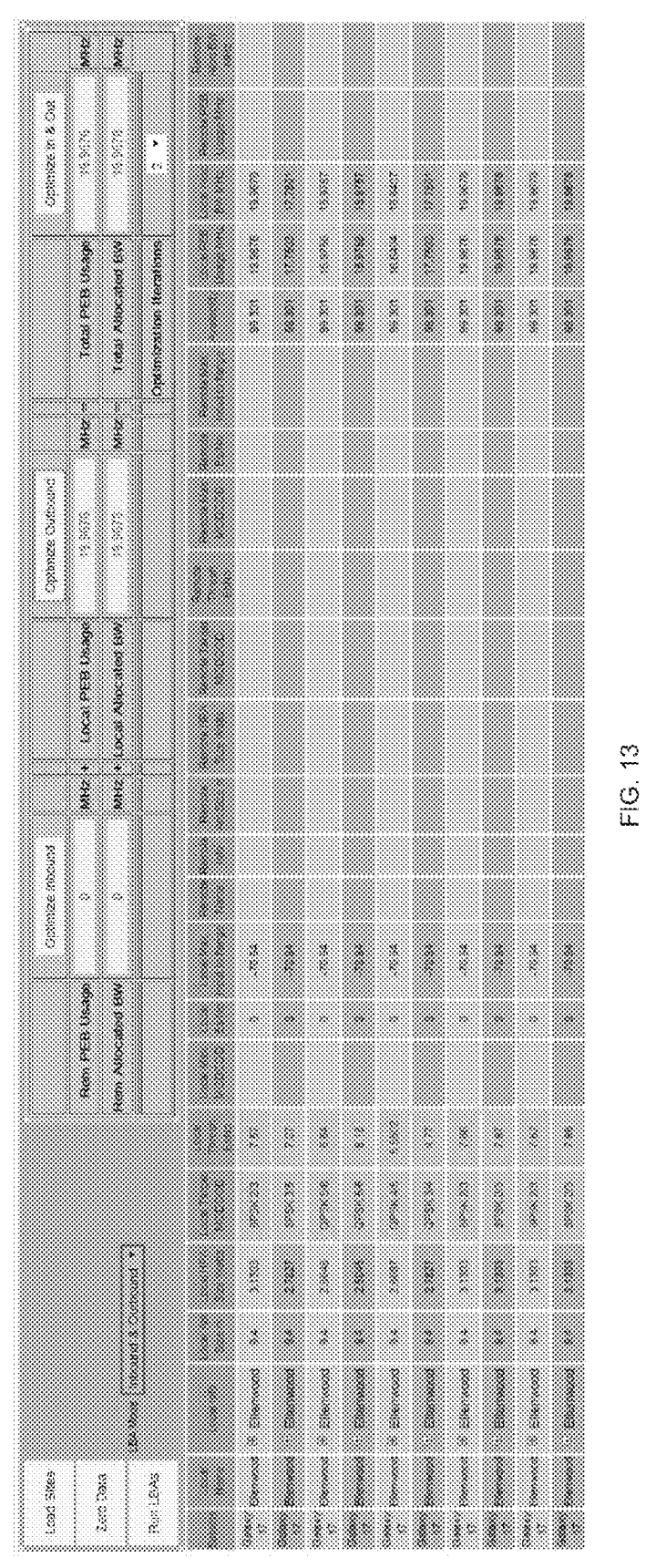

Step 3: Iteratively run the algorithm that uses the excess margin reported by the LBA to ensure optimization as shown in FIGS. 11-13.

At this point, one or more of the following actions may be taken. If Excess Margin is less than 0 for the Clear Sky, Rain Up, or Rain Down, and the PEB Bandwidth is less than Allocated Bandwidth, then Power (or antenna size) is increased. If Excess Margin is less than 0 for the Clear Sky, Rain Up, or Rain Down, and the PEB Bandwidth is greater than the Allocated Bandwidth, then Power (or antenna size) is decreased. If Excess Margin is greater than 0 for either the Clear Sky, Rain Up, or Rain Down, and the PEB Bandwidth is greater than the Allocated Bandwidth, MODCOD is lowered (more FEC). If Excess Margin is greater than 0 for the Clear Sky, Rain Up, or Rain Down, and the PEB Bandwidth is less than the Allocated Bandwidth, MODCOD is increased (less FEC).

The algorithm may be run using an implementation of the method based on the number of times set by the user and the values used for each pass of the algorithm use the results of the previous value's iteration. If the MODCOD was adjusted, then this is used in the next iteration or if the power or antenna was adjusted, then this is used in the next iteration. At the last iteration, the last pass through the method (or iteration) is the final result presented to the user and becomes the contribution to the final accounting of the Allocated Bandwidth and PEB Bandwidth for all links being optimized. Alternatively, the user may select optimize only MODCOD (iterations set to 0) or optimize MODCOD, power, or antenna size, which sets the iterations above 0.

An example of an implementation of the method is as follows:

Using the results from FIG. 11, the "target" MODCOD 1100 was set to 8PSK 2/3 (which requires an Es/No of 7.57 dB to close the link) for Remote0.

As can be shown, after two passes through the algorithm, 1100 shows the new MODCOD is 8PSK 2/3, with an Es/No Threshold of 7.57 dB as shown by the local HPA size in Watts 1110. The resulting balancing where the Local PEB Bandwidth 1120 and Allocated Bandwidth 1130 are nearly equal (balanced).

As shown in FIGS. 9 and 10, the power levels or the antenna size never change. However, in FIG. 11, the HPA power 1110 can be shown to change as a result of the Excess Ratio being used to set the amplifier power and MODCOD 1100 to achieve balance of the Allocated Bandwidth 1130 and PEB 1120.

An example of the algorithm is shown in FIG. 9, shows 900 target MODCOD and 910 target Es/No. After running the non-optimized LBA, the Excess Margin from the LBA is found to be 7.93 dB. Therefore, adding 7.93 dB of excess margin to 0.1 dB for the target Es/No shows the MAX MOD-COD 920 of 8PSK 2/3 which has a Target Es/No of 7.0 dB. The Local PEB Usage 930 shows the PEB as 11.4819 MHz and Allocated Bandwidth 940 as 33.2614 MHz. Using FIG. 10 which shows the optimization with only the use of the Excess Margin where the PEB 1000 is 11.4819 MHz and the Allocated Bandwidth 1010 is 19.9676 MHz. From this first (and simple) operation, the PEB 1000 is 11.4819 MHz and Allocated Bandwidth 1010 is 19.9678 MHz, so the Allocated Bandwidth was reduced by 13.2936 MHz by this first step.

FIG. 11 shows the resulting optimization after running the Excess Ratio algorithm two times (in a iterative fashion) which has resulted in the same MODCOD as the first optimization 920, but the power has been given a degree of freedom using the Excess Ratio, thus resulting in the MODCOD 110 still being 8PSK 2/3, but the power has been adjusted to 3.1303 Watts to optimize the PEB, resulting in the PEB 1120 being 19.9676 MHz and the Allocated Bandwidth 1130 being 19.9678 MHz, thus resulting a nearly perfectly balanced system. FIGS. 12-13 show how the optimization may be performed for the Inbound or Outbound independently with identical results.

The true proof of near perfect balance is demonstrated in the complete summary of Inbound PEB 1140 being nearly equal to the Allocated Bandwidth, Outbound PEB 1150 being nearly equal to the Allocated Bandwidth, and Inbound+Outbound (total) PEB 1160 being nearly equal to the Allocated Bandwidth.

In the existing art, to optimize a link, one must perform the LBA many times by hand using trial and error to attempt to make the PEB and allocated bandwidth equal or close to one another. A link is considered to be optimized when the allocated bandwidth and PEB are nearly equal. In this case, the allocated bandwidth and PEB are being used at "nearly perfect" balance or efficiency.

The cited examples show a LBA for a communications link in the outbound direction, but the same exercise may be performed for the inbound direction using the same or different MODCOD. In the cited examples, the outbound link uses DVB-S2, but the inbound links are using a different FEC that result in different Es/No requirements to close the link, but the procedures utilized are conducted in an identical manner. Therefore, FIG. 14 may further comprise a different look up table with modulation types, FEC rates, efficiencies, and required Es/No values required to close the link in accordance with the parameters of each link.

Another aspect of novelty of the disclosed system and method involves using a first implementation of the method of finding the optimal MODCOD in the following manner. If one uses the newly obtained "optimal MODCOD" using the first implementation of the method as illustrated by the examples above, and then re-runs the LBAs with the Target MODCOD replaced with the Optimal MODCOD, the net result is that by replacing the target with the optimal MODCOD using an implementation of the method, the allocated bandwidth and PEB bandwidth become "balanced." FIG. 11 shows an output resulting from performing the optimization using an implementation of the described method for both the inbound and outbound LBAs.

Another novel aspect of the system and method may be realized for a point-to-point link or an inbound link, such as for example, from a remote VSAT satellite to a hub earth station. The allocated bandwidth and PEB are summed for every link and the total is presented. The sum of all the links' allocated bandwidths and PEBs are summed to create a total allocated bandwidth and total PEB. However, for a common or shared link, such as for example, an outbound link from the hub earth station to the remote VSAT satellite, the allocated bandwidth and PEBs are not summed. Instead, for a shared link such as for example, a common or shared outbound link, the worst (most disadvantaged) link's allocated bandwidth and worst (most disadvantaged) link's PEB is used. A "MAX" function may be used to search either the allocated bandwidth column or PEB bandwidth column of data to determine the highest value that is found in each respective column, which then becomes the value used for the allocated bandwidth and PEB values presented to the user. When running implementations of the described method for optimizing the LBA, these values become nearly equal or balanced.

Implementations of the disclosed method can further be configured to allow the LBAs to be run for only inbound links as shown in FIG. 12 or only the outbound links as shown in FIG. 13. In all scenarios, when the optimization is performed, the links are fully optimized, meaning that the allocated bandwidth and PEB are balanced for every LBA that is configured.

As one of ordinary skill in the art will recognize, it is impossible to have a "perfectly balanced link," but the user may purposefully take any non-perfect bandwidth (allocated or PEB) and reallocate the overage to the other type of bandwidth, such as for example, if there is too much allocated bandwidth, it may be desirable to move some of this bandwidth to PEB bandwidth and vice versa.

The following are particular implementations with optimization techniques for satellite link budget analysis (LBA) implementations of such related methods which are provided as non-limiting examples of implementations of the disclosed systems and methods.

EXAMPLE 1

A satellite earth station is being designed to operate at an assigned center frequency, symbol rate and polarization to a satellite repeating relay at a particular geo-equatorial location, polarization and frequency. For this example, the earth station terminal is supporting a point-to-multipoint configuration where the primary (hub) carrier is providing a common communications path to ten (10) remote terminals. Using an implementation of the described method, all of the parameters are entered into the LBA tool and the LBA is performed. Using an implementation of the described method, one may start with Target MODCODs and the result is the Optimal MODCOD that may be used for supporting communications to and from each remote location.

EXAMPLE 2

In particular implementations of the system described in example 1, when the user desires to optimize both the inbound and outbound links, an implementation of the described method uses the Optimal MODCOD as the Target MODCOD and the one or more LBAs are then re-run. The result is that both the inbound and outbound links are optimized where the allocated bandwidth and PEB are balanced.

EXAMPLE 3

In particular implementations of the system described in example 1, when the user desires to optimize the inbound links, an implementation of the described method uses the Optimal MODCOD as the Target MODCOD and the one or more LBAs are then re-run. The result is that the inbound links are optimized where the allocated bandwidth and PEB are balanced for only the inbound links and the outbound links remain as originally calculated.

EXAMPLE 4

In particular implementations of the system described in example 1, when the user desires to optimize the outbound links, an implementation of the described method uses the Optimal MODCOD as the Target MODCOD and the one or more LBAs are then re-run. The result is that the outbound links are optimized where the allocated bandwidth and PEB are balanced for only the outbound links and the inbound links remain as originally calculated.

EXAMPLE 5

In particular implementations of the system described in example 1, when the user desires to optimize the inbound links, an implementation of the described method uses the optimal power of the amplifier as the initial setting of the amplifier and the one or more LBAs are then re-run. The result is that the inbound links are optimized where the allocated bandwidth and PEB are balanced for only the outbound links and the inbound links remain as originally calculated.

EXAMPLE 6

In particular implementations of the system described in example 1, when the user desires to optimize the outbound links, an implementation of the described method uses the optimal power of the amplifier as the initial setting of the amplifier and the one or more LBAs are then re-run. The result is that the outbound links are optimized where the allocated bandwidth and PEB are balanced for only the outbound links and the inbound links remain as originally calculated.

EXAMPLE 7

In particular implementations of the system described in example 1, when the user desires to optimize the inbound links, an implementation of the described method uses the optimal antenna size as the initial setting of the antenna size and the one or more LBAs are then re-run. The result is that the inbound links are optimized where the allocated bandwidth and PEB are balanced for only the outbound links and the inbound links remain as originally calculated.

EXAMPLE 8

In particular implementations of the system described in example 1, when the user desires to optimize the outbound links, an implementation of the described method uses the optimal antenna size as the initial setting of the antenna size and the one or more LBAs are then re-run. The result is that the outbound links are optimized where the allocated bandwidth and PEB are balanced for only the outbound links and the inbound links remain as originally calculated.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of optimizing a link budget analysis (LBA) for a communications link within a communications system having a plurality of communications links comprising:
   performing, using a processor, a first LBA based on a target modulation and coding pair (MODCOD) that is selected based on one or more transmission or receiving link parameters, the MODCOD having at least one of a predetermined symbol energy to noise density ratio (Es/No), a target setting of a power amplifier, and a target antenna size;
   determining, by the processor, an excess margin from the first LBA and increasing or decreasing a maximum available MODCOD based on whether the excess margin has a positive or a negative value;
   performing, by the processor, a second LBA using the increased or decreased maximum MODCOD and iteratively repeating increasing or decreasing the maximum available MODCOD and performing a subsequent LBA using the increased or decreased maximum available MODCOD;
   calculating, by the processor a ratio of allocated bandwidth to a power equivalent bandwidth (PEB) and adjusting at least one of the MODCOD, amplifier power, and antenna size based on the calculated ratio;
   determining, by the processor, whether additional energy is present in the communications link by summing a contribution to a final ratio of allocated bandwidth to PEB of the communications system made by each of the plurality of communications links;
   accessing a look up table (LUT) to determine an optimal MODCOD for the communications link wherein at least one of the following actions is performed by the processor:
      if the sum is a positive value, selecting a MODCOD having a higher Es/No; or
      if the sum is a negative value, selecting a MODCOD having a lower Es/No; or
      adjusting the amplifier size or antenna size is based on the ratio of allocated bandwidth to PEB; and
   altering one or more transmission or receiving parameters to apply the selected optimal MODCOD, amplifier size, or antenna size.

2. The method of claim 1 further comprising performing the first LBA using at least one of an initial MODCOD, amplifier power setting, and antenna size setting.

3. The method of claim 1 further comprising performing a first optimization using results of the first LBA using a maximum MODOCD as determined from the excess margin of the first LBA without adjusting the amplifier power or antenna size.

4. The method of claim 1, wherein the optimal MODCOD selected has an Es/No that is a highest value among possible MODCODS without exceeding a sum of the Es/No of the target MODCOD and the calculated ratio of allocated bandwidth to PEB.

5. The method of claim 1, wherein the optimal MODCOD selected has an Es/No that exceeds a sum of the Es/No of a target MODCOD and the calculated ratio of allocated bandwidth to PEB by an amount that is within a predetermined range of variance of the sum.

6. The method of claim 1, further comprising:
performing a plurality of first LBAs based on a plurality of target MODCODs for a plurality of communications links; and
summing the calculated ratios of allocated bandwidth to PEB for all of the communications links to result in a total allocated bandwidth and a total PEB.

7. The method of claim 1, further comprising:
performing a plurality of first LBAs based on a plurality of target MODCODs for a plurality of links sharing a common transmission or receiving hub;
calculating a ratio of allocated bandwidth to a power equivalent bandwidth (PEB) a maximum allocated bandwidth from among the plurality of links and a maximum PEB from among the plurality of links and converting the calculated ratio to Decibels; and
determining whether additional energy is present in the plurality of communications links by summing the Es/No for a most disadvantaged communications link at the target MODCOD and the calculated ratio of allocated bandwidth to PEB based on the maximum allocated bandwidth and PEB from among the plurality of links.

8. The method of claim 1, wherein the communications link is a forward link over which communications are transmitted from a local transmitter to a remote receiver.

9. The method of claim 1, wherein the communications link is a return link over which communications are transmitted from a local receiver to a remote transmitter.

10. The method of claim 1, wherein the method is performed using both a forward link over which communications are transmitted from a local transmitter to a remote receiver and a return link over which communications are transmitted from a local receiver to a remote transmitter.

11. A system for optimizing a link budget analysis (LBA) for a communications link within a communications system having a plurality of communications links comprising:
a transmitter configured to transmit a communications signal;
a receiver configured to receive the communications signal and create a communications link between the transmitter and receiver, the receiver and transmitter located remotely from each other; and
a processor configured to:
perform a first LBA based on a target modulation and coding pair (MODCOD) that is selected based on one or more transmission or receiving link parameters, the MODCOD having at least one of a predetermined symbol energy to noise density ratio (Es/No), a target setting of a power amplifier, and a target antenna size;
determine an excess margin from the first LBA and increase or decrease a maximum available MODCOD based on whether the excess margin has a positive or a negative value;
perform a second LBA using the increased or decreased maximum MODCOD;
iteratively repeat increasing or decreasing the maximum available MODCOD and perform a subsequent LBA using the increased or decreased maximum available MODCOD;
calculate a ratio of allocated bandwidth to a power equivalent bandwidth (PEB) and adjust at least one of the MODCOD, amplifier power, and antenna size based on the calculated ratio;
determine whether additional energy is present in the communications link by summing a contribution to a final ratio of allocated bandwidth to PEB of the communications system made by each of the plurality of communications links;
access a look up table (LUT) to determine an optimal MODCOD for the communications link and perform at least one of the following actions:
if the sum is a positive value, a MODCOD having a higher Es/No is selected; or
if the sum is a negative value, a MODCOD having a lower Es/No is selected; or
the amplifier size or antenna size is adjusted based on the ratio of allocated bandwidth to PEB; and
alter one or more transmission or receiving parameters to apply the selected optimal MODCOD, amplifier size, or antenna size.

12. The system of claim 11, wherein the processor is further configured to perform the first LBA using at least one of an initial MODCOD, amplifier power setting, and antenna size setting.

13. The system of claim 11, wherein the processor is further configured to perform a first optimization using results of the first LBA using a maximum MODOCD as determined from the excess margin of the first LBA without adjusting the amplifier power or antenna size.

14. The system of claim 11, wherein the optimal MODCOD selected has an Es/No that is a highest value among possible MODCODS without exceeding a sum of the Es/No of the target MODCOD and the calculated ratio of allocated bandwidth to PEB.

15. The system of claim 11, wherein the optimal MODCOD selected has an Es/No that exceeds a sum of the Es/No of a target MODCOD and the calculated ratio of allocated bandwidth to PEB by an amount that is within a predetermined range of variance of the sum.

16. The system of claim 11, wherein the processor is further configured to:
perform a plurality of first LBAs based on a plurality of target MODCODs for a plurality of communications links; and
sum the calculated ratios of allocated bandwidth to PEB for all of the communications links to result in a total allocated bandwidth and a total PEB.

17. The system of claim 11, wherein the processor is further configured to:
perform a plurality of first LBAs based on a plurality of target MODCODs for a plurality of links sharing a common transmission or receiving hub;
calculate a ratio of allocated bandwidth to a power equivalent bandwidth (PEB) a maximum allocated bandwidth from among the plurality of links and a maximum PEB from among the plurality of links and converting the calculated ratio to Decibels; and
determine whether additional energy is present in the plurality of communications links by summing the Es/No for a most disadvantaged communications link at the target MODCOD and the calculated ratio of allocated bandwidth to PEB based on the maximum allocated bandwidth and PEB from among the plurality of links.

18. The system of claim 11, wherein the communications link is a forward link over which communications are transmitted from a local transmitter to a remote receiver.

19. The system of claim 11, wherein the communications link is a return link over which communications are transmitted from a local receiver to a remote transmitter.

20. The system of claim 11, wherein the processor is further configured to use both a forward link over which communications are transmitted from a local transmitter to a remote receiver and a return link over which communications are transmitted from a local receiver to a remote transmitter.

\* \* \* \* \*